US010262335B2

(12) United States Patent
Zises

(10) Patent No.: US 10,262,335 B2
(45) Date of Patent: Apr. 16, 2019

(54) SYSTEMS AND METHODS FOR REAL TIME UPGRADES

(71) Applicant: STUBHUB, INC., San Francisco, CA (US)

(72) Inventor: Matthew Scott Zises, San Jose, CA (US)

(73) Assignee: EBAY INC., San Jose, CA (US)

(*) Notice: Subject to any disclaimer, the term of this patent is extended or adjusted under 35 U.S.C. 154(b) by 0 days.

(21) Appl. No.: 14/187,200

(22) Filed: Feb. 21, 2014

(65) Prior Publication Data
US 2015/0242888 A1 Aug. 27, 2015

(51) Int. Cl.
G06Q 30/00 (2012.01)
G06Q 30/02 (2012.01)

(52) U.S. Cl.
CPC .................. G06Q 30/0252 (2013.01)

(58) Field of Classification Search
CPC .................................. G06Q 30/0252
See application file for complete search history.

(56) References Cited

U.S. PATENT DOCUMENTS

| 4,752,876 A * | 6/1988 | Couch et al. ............... 705/5 |
| 7,162,454 B1 * | 1/2007 | Donner .................. G06Q 10/02 235/382 |
| 2001/0056482 A1 * | 12/2001 | Lewis ..................... G06Q 50/24 709/224 |
| 2002/0186133 A1 * | 12/2002 | Loof ....................... G06Q 20/20 340/572.1 |
| 2003/0065805 A1 * | 4/2003 | Barnes, Jr. .............. G06Q 10/02 709/231 |
| 2003/0069789 A1 * | 4/2003 | Gathman ................ G06Q 10/02 705/14.64 |
| 2003/0187685 A1 * | 10/2003 | Bakker ............................ 705/1 |
| 2006/0015254 A1 * | 1/2006 | Smith .............................. 702/3 |
| 2006/0095344 A1 * | 5/2006 | Nakfoor ......................... 705/26 |
| 2006/0173781 A1 | 8/2006 | Donner |

(Continued)

OTHER PUBLICATIONS

Cisco Systems, "Wi-Fi Based Real-Time Location Tracking: Solutions and Technology", Dec. 2006, on line at Cisco.com.*

(Continued)

Primary Examiner — Kambiz Abdi
Assistant Examiner — Scott C Anderson
(74) Attorney, Agent, or Firm — Maschoff Brennan

(57) ABSTRACT

A system can offer an enhanced event experience for users of the system by tracking the locations of the users during a purchased-access event such as a ticketed event and offering real time location-based upgrades to the users. The locations of users can be used to determine a demonstrated interest by the user for a particular location or product in the event venue and to offer upgrades tailored to that demonstrated interest. For example, a concert attendee with a ticket for a particular seat may be detected a location relatively far from the user's seat such as a location near a seat of a friend of the user. The system can detect the user's location, identify available seats near the user's location, and offer the user an upgrade to the identified available seats. Location-based upgrades can also be provided in airplanes, hotels, cruise ships, or other venues or events.

20 Claims, 10 Drawing Sheets

(56) References Cited

U.S. PATENT DOCUMENTS

| | | |
|---|---|---|
| 2007/0124232 A1 | 5/2007 | Brett |
| 2007/0143185 A1 | 6/2007 | Harmon et al. |
| 2008/0086377 A1† | 4/2008 | Jain |
| 2008/0091479 A1 | 4/2008 | Mortimore |
| 2008/0271072 A1 | 10/2008 | Rothschild et al. |
| 2008/0287142 A1* | 11/2008 | Keighran ............... 455/456.5 |
| 2009/0030741 A1* | 1/2009 | Veitch ............... 705/5 |
| 2009/0030748 A1† | 1/2009 | Halavais |
| 2009/0055271 A1* | 2/2009 | Drefs ............ G06Q 30/0226 705/14.27 |
| 2009/0216702 A1* | 8/2009 | Proctor ............ G06N 5/025 706/48 |
| 2011/0105090 A1* | 5/2011 | Shackleton ........ G06Q 20/3224 455/414.1 |
| 2012/0078667 A1† | 3/2012 | Denker |
| 2012/0215637 A1 | 8/2012 | Hermann |
| 2012/0230539 A1* | 9/2012 | Calman et al. ............... 382/103 |
| 2012/0323488 A1* | 12/2012 | Callaghan ............ G06Q 10/02 701/454 |
| 2013/0059598 A1* | 3/2013 | Miyagi ................ H04W 4/023 455/456.1 |
| 2013/0124234 A1 | 5/2013 | Nilsson et al. |
| 2013/0182117 A1 | 7/2013 | Arseneau et al. |
| 2013/0275257 A1* | 10/2013 | David ............... G06Q 30/0621 705/26.5 |
| 2014/0039945 A1* | 2/2014 | Coady .................. G06Q 10/02 705/5 |

OTHER PUBLICATIONS

International Search Report and Written Opinion, as issued in connection with International Patent Application No. PCT/US2014/070859, dated Mar. 19, 2015, 9 gs.

\* cited by examiner
† cited by third party

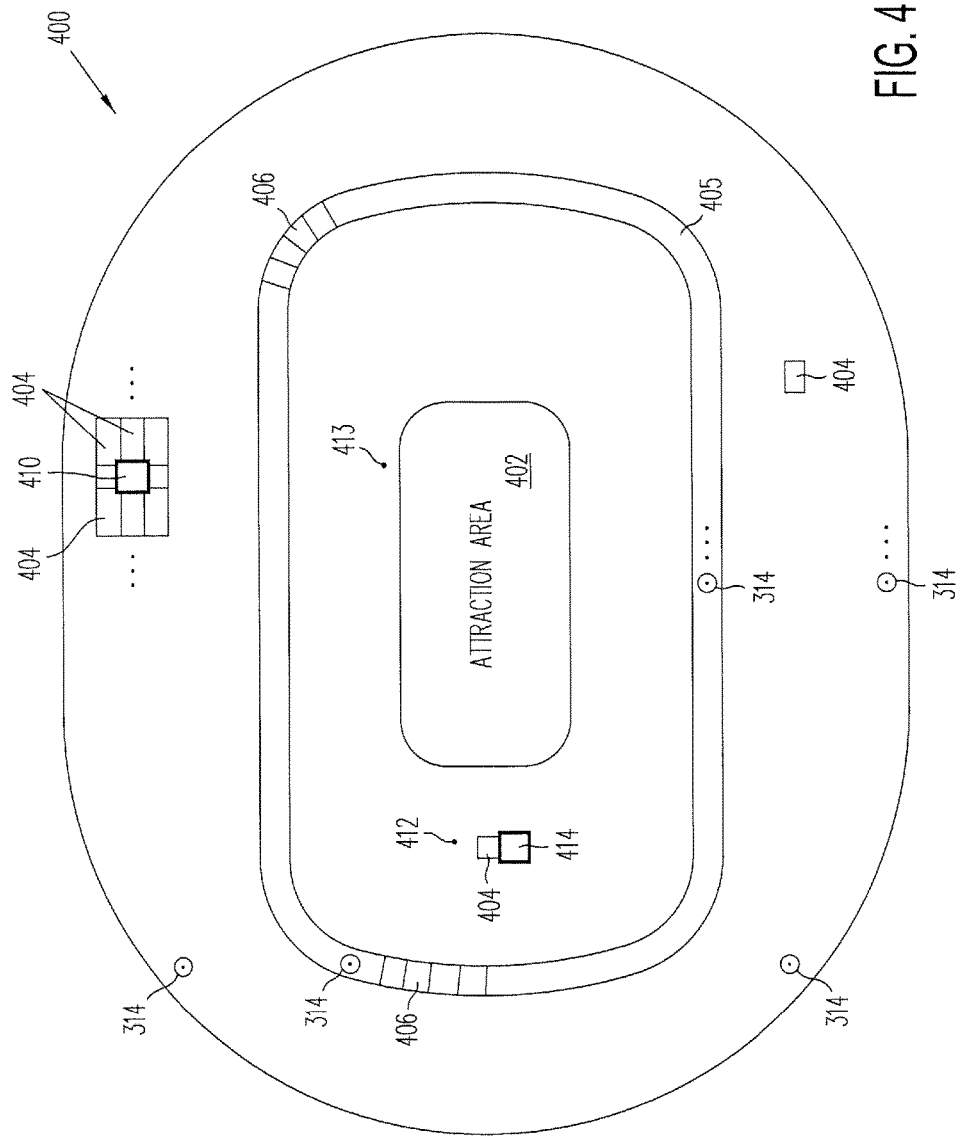

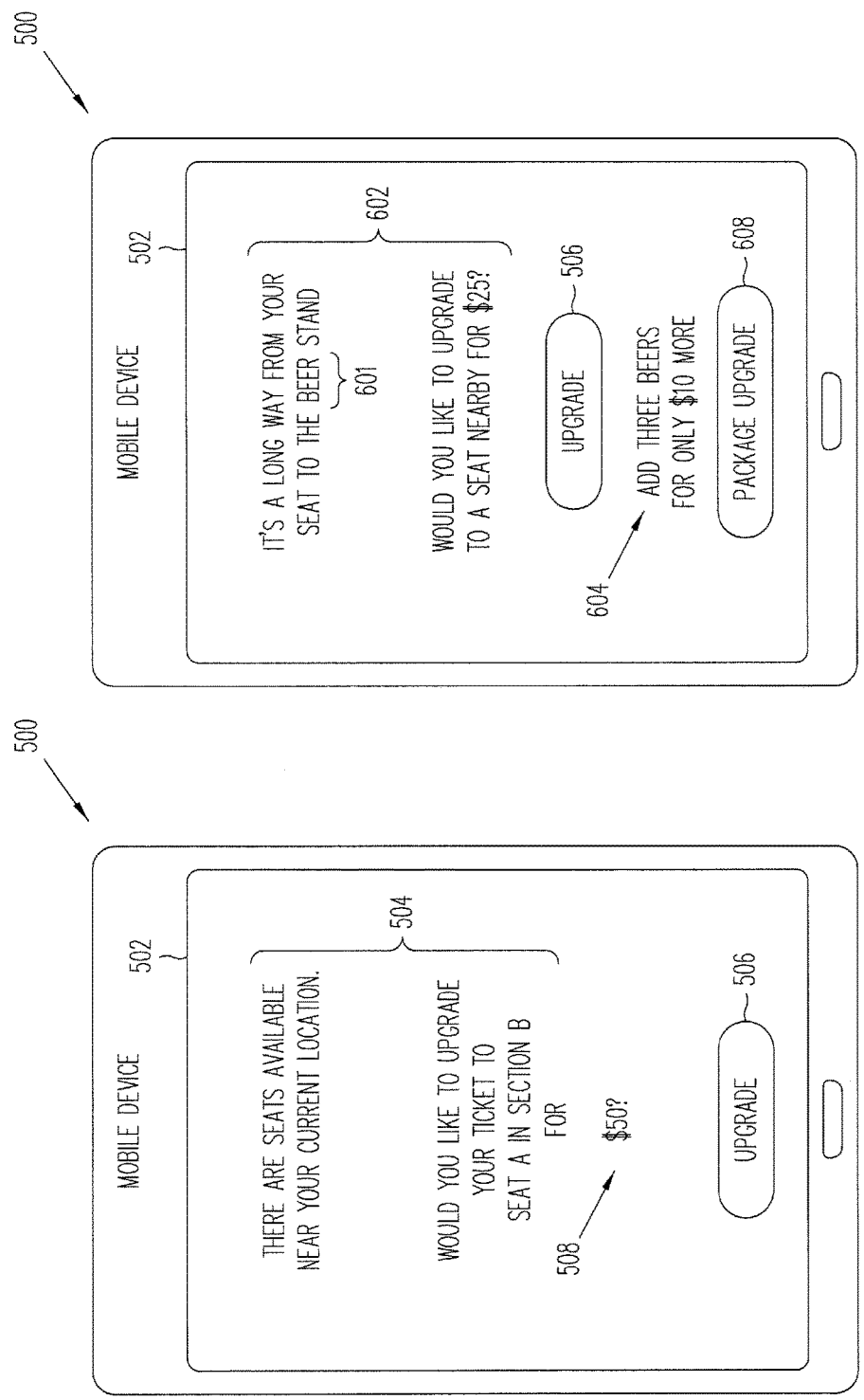

SYSTEMS AND METHODS FOR REAL TIME UPGRADES

BACKGROUND

Technical Field

The present disclosure relates generally to electronic commerce, and more particularly, to the buying and selling of real time upgrades during purchased-access events.

Related Art

Computer systems and networks have facilitated the tasks of buying, selling and transferring goods. For example, global computer networks, such as the Internet, have allowed purchasers to relatively quickly and efficiently seek and purchase goods online. Similarly, global computer networks provide an efficient and cost-effective medium for sellers to advertise, offer, provide, and sell their goods. Electronic commerce companies provide buyers and sellers with online services and the infrastructure to accept orders of goods from remote purchasers, to perform the financial transactions necessary to confirm and complete the sale of goods, to ship or distribute the goods to remote purchasers, and to perform other related logistics.

One example of a market for goods within the realm of electronic commerce is the online ticket market. Various online ticket sellers provide websites through which parties can buy and sell tickets online. These tickets can be obtained by a user to reserve seats and/or admission for a variety of events, such as sporting events, concerts, theater events, and other entertainment events. Typically, a buyer looks for available tickets on a ticket marketplace website or other online listing and decides which, if any, of the available tickets are of interest to the buyer for possible purchase.

When a ticket is purchased and the ticketholder attends the associated event, for various reasons, the user may not spend a significant amount of time in the seat for which they purchased the ticket. Currently there is no way for a user to legitimately remain in a location other than the user's seat and there is no way for event venues and owners to leverage the user's already demonstrated interest in the location for further sales.

It may therefore be desirable to provide systems and methods for providing real time upgrades for various purchased-access events such as ticketed events.

BRIEF DESCRIPTION OF THE DRAWINGS

FIG. 4 is a diagram of an illustrative event venue showing an event attendee location and various other locations in the venue according to an embodiment.

FIG. 5 is a diagram of an illustrative location-based upgrade offer that may be provided to a user on a mobile device according to an embodiment.

FIG. 6 is a diagram of an illustrative package upgrade offer that may be provided to a user on a mobile device according to an embodiment.

DETAILED DESCRIPTION

Figure 1:
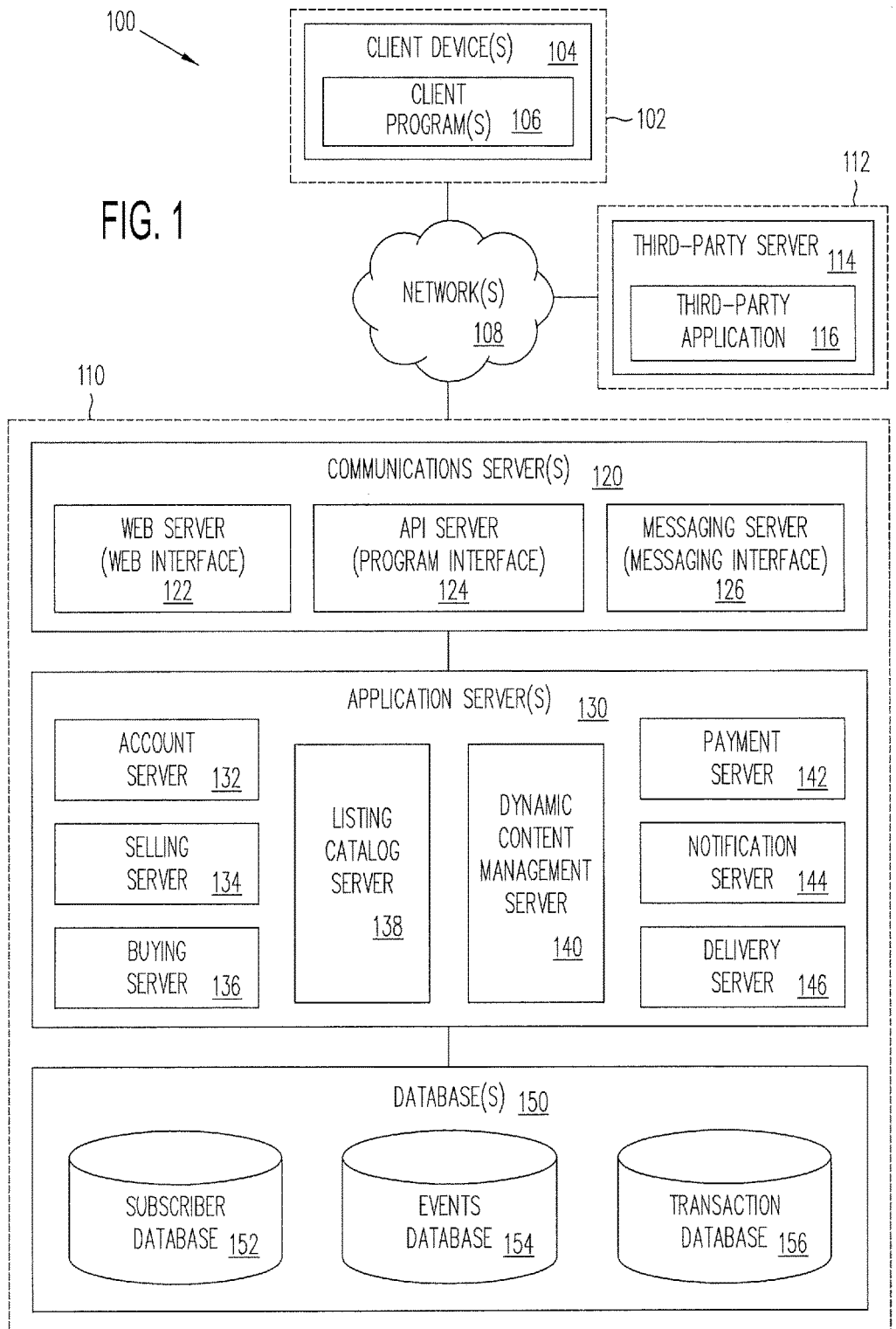
FIG. 1 is a block diagram of an illustrative computing system that is adapted for implementing the selection and purchase of tickets and/or real time upgrades for ticketed events according to an embodiment.

Exemplary applications of apparatuses and methods according to the present invention are described in this section. These examples are being provided solely to add context and aid in the understanding of the invention. It will thus be apparent to one skilled in the art that the present invention may be practiced without some or all of these specific details. In other instances, well known process steps have not been described in detail in order to avoid unnecessarily obscuring the present invention. Other applications are possible, such that the following examples should not be taken as limiting.

In the following detailed description, references are made to the accompanying drawings, which form a part of the description and in which are shown, by way of illustration, specific embodiments of the present invention. Although these embodiments are described in sufficient detail to enable one skilled in the art to practice the invention, it is understood that these examples are not limiting, such that other embodiments may be used, and changes may be made without departing from the spirit and scope of the invention.

Devices, systems and methods are provided for performing activities related to the online sale, purchase, and resale of tickets to ticketed events. In various particular embodiments, the devices, systems or methods can involve one or more devices in communication over a network. Such devices, systems, and methods can facilitate real time upgrades for event attendees during a ticketed event. Real time upgrade activities may include location-based upgrades for an attendee of an event at a venue based on the detected or determined location of the attendee during the event.

In various embodiments, a system may determine a location of an event attendee during the event, determine, based at least in part on the determined location, an upgrade offer for the attendee, and provide the determined upgrade offer to the attendee. For example, an attendee of a sporting event may have a ticket for a seat in a particular section of a venue and may have a detected location in another section of the venue (e.g., a section with a better view or a section in which the attendee's friends are located). The system may detect the location of the attendee as being different from the attendee's seat location, identify one or more unused seats near the attendee's determined location, and offer the attendee an upgrade to the unused seats so that attendee can legitimately remain in approximately their current location. In this way, the attendee's demonstrated interest in a particular portion of an event venue can be used to provide the attendee with an enhanced event experience while providing additional income for the venue. Location-based upgrade activities of this type can therefore help event attendees increase enjoyment of a ticketed event and may help increase sales for an event owner or venue owner during ticketed events.

While the various examples disclosed herein focus on particular aspects regarding the online sale and/or purchase of tickets, it will be understood that the various inventive principles and embodiments disclosed herein can be applied to other types of ticketed applications and arrangements as well. For example, a ticket purchase that is performed in person or on a closed or proprietary computing system may utilize one or more of the aspects and features found in the various systems and methods provided.

Reference throughout the specification to "various embodiments," "some embodiments," "one embodiment," "an embodiment," "various examples," "one example," "an example," or "some examples" means that a particular feature, structure, or characteristic described in connection with the embodiment or example is included in at least one embodiment. Thus, appearances of these are not necessarily all referring to the same embodiment. Furthermore, the particular features, structures or characteristics may be combined in any suitable manner in one or more embodiments.

According to an embodiment, a computer program product can comprise a non-transitory machine readable medium. The non-transitory machine readable medium can have computer readable and executable code for instructing one or more processors to perform any of the methods disclosed herein.

Beginning with FIG. 1, an exemplary embodiment of a computing system adapted for implementing the selection and purchase of tickets for ticketed events and/or location-based upgrades for ticketed events is illustrated in block diagram format. As shown, a computing system 100 may comprise or implement a plurality of servers and/or software components that operate to perform various methodologies in accordance with the described embodiments. Exemplary servers may include, for example, stand-alone and enterprise-class servers operating a server OS such as a MICROSOFT® OS, a UNIX® OS, a LINUX® OS, or other suitable server-based OS. It can be appreciated that the servers illustrated in FIG. 1 may be deployed in other ways and that the operations performed and/or the services provided by such servers may be combined or separated for a given implementation and may be performed by a greater number or fewer number of servers. One or more servers may be operated and/or maintained by the same or different entities.

Computing system 100 can include, among various devices, servers, databases and other elements, a client 102 that may comprise or employ one or more client devices 104, such as a laptop, a mobile computing device, a PC, and/or any other computing device having computing and/or communications capabilities in accordance with the described embodiments. In particular, it is specifically contemplated that client devices 104 can include a cellular telephone or other similar mobile device that a user can carry on or about his or her person and access readily.

Client devices 104 generally may provide one or more client programs 106, such as system programs and application programs to perform various computing and/or communications operations. Exemplary system programs may include, without limitation, an operating system (e.g., MICROSOFT® OS, UNIX® OS, LINUX® OS, Symbian OS™, Embedix OS, Binary Run-time Environment for Wireless (BREW) OS, Java OS, a Wireless Application Protocol (WAP) OS, and others), device drivers, programming tools, utility programs, software libraries, application programming interfaces (APIs), and so forth. Exemplary application programs may include, without limitation, a web browser application, messaging applications (e.g., e-mail, IM, SMS, MMS, telephone, voicemail, VoIP, video messaging), contacts application, calendar application, electronic document application, database application, media application (e.g., music, video, television), location-based services (LBS) application (e.g., GPS, mapping, directions, point-of-interest, locator), and so forth. One or more of client programs 106 may display various graphical user interfaces (GUIs) to present information to and/or receive information from one or more of client devices 104.

As shown, client 102 can be communicatively coupled via one or more networks 108 to a network-based system 110. Network-based system 110 may be structured, arranged, and/or configured to allow client 102 to establish one or more communications sessions with network-based system 110 using various computing devices 104 and/or client programs 106. Accordingly, a communications session between client 102 and network-based system 110 (e.g., a communications session for location-based upgrades for attendees of a purchased-access event such as a ticketed event) may involve the unidirectional and/or bidirectional exchange of information and may occur over one or more types of networks 108 depending on the mode of communication. While the embodiment of FIG. 1 illustrates a computing system 100 deployed in a client-server operating environment, it is to be understood that other suitable operating environments and/or architectures may be used in accordance with the described embodiments.

Data and/or voice communications between client 102 and the network-based system 110 may be sent and received over one or more networks 108 such as the Internet, a WAN, a WWAN, a WLAN, a mobile telephone network, a landline telephone network, a VoIP network, as well as other suitable networks. For example, client 102 may communicate with network-based system 110 over the Internet or other suitable WAN by sending and or receiving information via interaction with a web site, e-mail, IM session, and/or video messaging session. Any of a wide variety of suitable communication types between client 102 and system 110 can take place, as will be readily appreciated. In particular, wireless communications of any suitable form may take place between client 102 and system 110, such as that which often occurs in the case of mobile phones or other personal mobile devices.

In various embodiments, computing system 100 can include, among other elements, a third party 112, which may comprise or employ a third-party server 114 hosting a third-party application 116. In various implementations, third-party server 114 and/or third-party application 116 may host a web site associated with or employed by a third party 112. For example, third-party server 114 and/or third-party application 116 may enable network-based system 110 to provide client 102 with additional services and/or information, such as additional ticket inventory. Third-party server 114 and/or third-party application 116 may provide system 110 and/or client 102 with email services and/or information, social networking services and/or information, travel services and/or information, purchase services and/or information, or other online services and/or information.

In one embodiment, third party server 112 may include a social networking server that hosts a user's social network account. In another embodiment, third party server 112 may include an email server that hosts a user's email account. In some embodiments, one or more of client programs 106 may be used to access network-based system 110 via third party 112. For example, client 102 may use a web client to access and/or receive content from network-based system 110 after initially communicating with a third-party web site 112.

Network-based system 110 may comprise one or more communications servers 120 to provide suitable interfaces that enable communication using various modes of communication and/or via one or more networks 108. Communications servers 120 can include a web server 122, an API server 124, and/or a messaging server 126 to provide interfaces to one or more application servers 130. Application servers 130 of network-based system 110 may be structured, arranged, and/or configured to provide various online marketplace, ticket fulfillment services, and/or location-based upgrade services to users that access network-based system 110. In various embodiments, client 102 may communicate with applications servers 130 of network-based system 110 via one or more of a web interface provided by web server 122, a programmatic interface provided by API server 124, and/or a messaging interface provided by messaging server 126. It can be appreciated that web server 122, API server 124, and messaging server 126 may be structured, arranged, and/or configured to communicate with various types of client devices 104 and/or client programs 106 and may interoperate with each other in some implementations.

Web server 122 may be arranged to communicate with web clients and/or applications such as a web browser, web browser toolbar, desktop widget, mobile widget, web-based application, web-based interpreter, virtual machine, and so forth. API server 124 may be arranged to communicate with various client programs 106 and/or a third-party application 116 comprising an implementation of API for network-based system 110. Messaging server 126 may be arranged to communicate with various messaging clients and/or applications such as e-mail, IM, SMS, MMS, telephone, VoIP, video messaging, and so forth, and messaging server 126 may provide a messaging interface to enable access by client 102 and/or third party 112 to the various services and functions provided by application servers 130.

When implemented as an online ticket marketplace, application servers 130 of network-based system 110 may provide various online marketplace and ticket fulfillment services including, for example, account services, buying services, selling services, listing catalog services, delivery services, payment services, gathering services, location-based upgrade services, and notification services. Application servers 130 may include an account server 132, a selling server 134, a buying server 136, a listing catalog server 138, a dynamic content management server 140, a payment server 142, a notification server 144, and/or a delivery server 146 structured and arranged to provide such online marketplace and ticket fulfillment and/or redistribution services.

Application servers 130, in turn, may be coupled to and capable of accessing one or more databases 150 including a subscriber database 152, an active events database 154, and/or a transaction database 156. Databases 150 generally may store and maintain various types of information for use by application servers 130 and may comprise or be implemented by various types of computer storage devices (e.g., servers, memory) and/or database structures (e.g., relational, object-oriented, hierarchical, dimensional, network) in accordance with the described embodiments.

Figure 2:
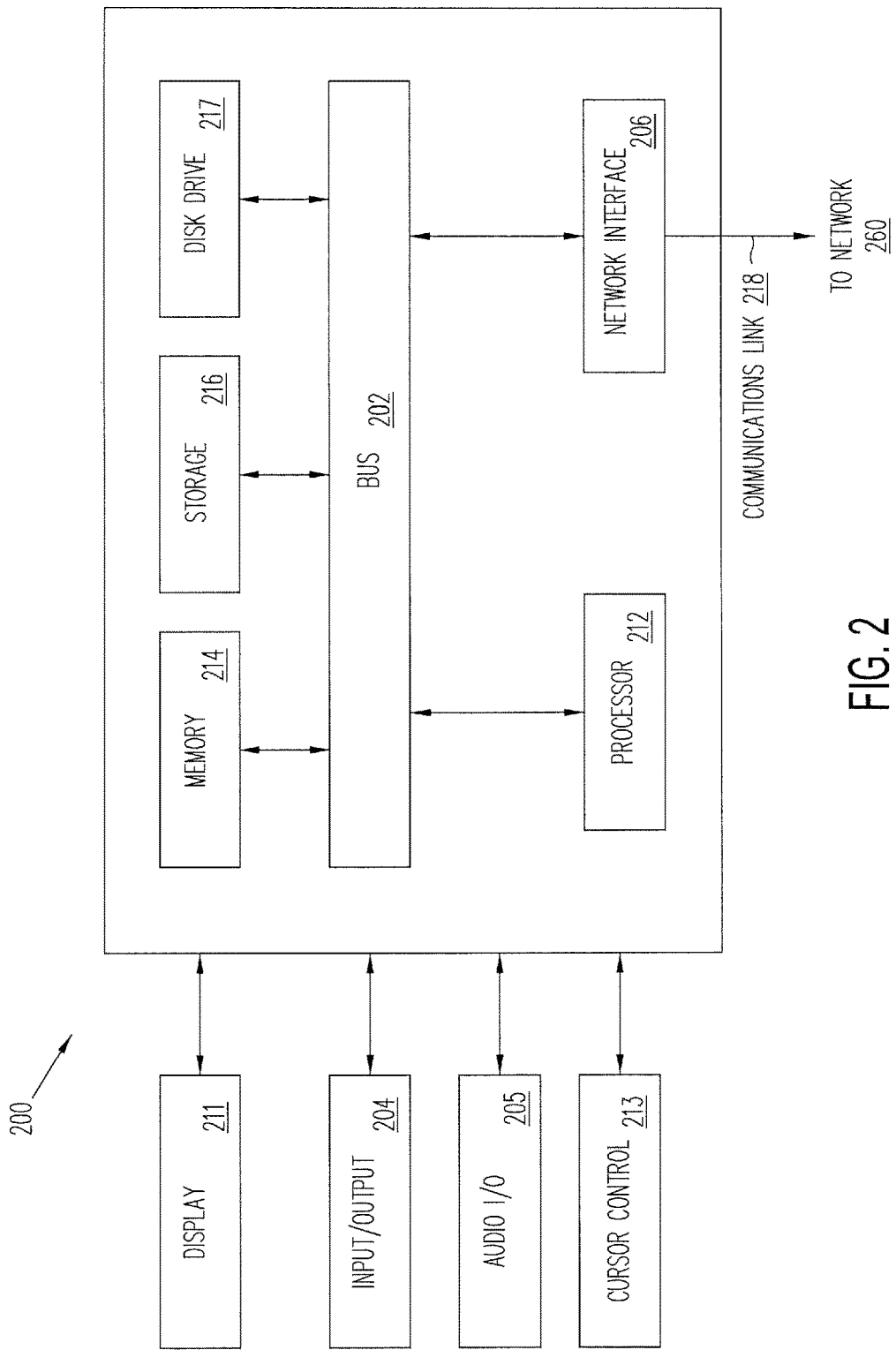
FIG. 2 is a block diagram of an illustrative computer system suitable for implementing on one or more devices of the computing system in FIG. 1 according to an embodiment.

Continuing with FIG. 2, an exemplary computer system 200 suitable for implementing on one or more devices of the computing system in FIG. 1 is depicted in block diagram format. In various implementations, a device that includes computer system 200 may comprise a personal computing device (e.g., a smart or mobile phone, a computing tablet, a personal computer, laptop, PDA, Bluetooth device, key FOB, badge, etc.) that is capable of communicating with a network. The ticket provider and/or a payment provider may utilize a network computing device (e.g., a network server) capable of communicating with the network. It should be appreciated that each of the devices utilized by users, ticket providers, and payment providers may be implemented as computer system 200 in a manner as follows.

Computer system 200 can include a bus 202 or other communication mechanism for communicating information data, signals, and information between various components of computer system 200. Components include an input/output (I/O) component 204 that processes a user action, such as selecting keys from a keypad/keyboard, selecting one or more buttons or links, etc., and sends a corresponding signal to bus 202. I/O component 204 may also include an output component, such as a display 211 and a cursor control 213 (such as a keyboard, keypad, mouse, etc.). An optional audio input/output component 205 may also be included to allow a user to use voice for inputting information by converting audio signals. Audio I/O component 205 may allow the user to hear audio. A transceiver or network interface 206 transmits and receives signals between computer system 200 and other devices, such as another user device, a merchant server, a venue server, an email server, a social networking server, other third-party servers, and/or a payment provider server via a network. In various embodiments, such as for many cellular telephone and other mobile device embodiments, this transmission can be wireless, although other transmission mediums and methods may also be suitable. A processor 212, which can be a micro-controller, digital signal processor (DSP), or other processing component, processes these various signals, such as for display on computer system 200 or transmission to other devices over a network 260 via a communication link 218. Again, communication link 218 can simply be a wireless communication form in some embodiments. Processor 212 may also control transmission of information, such as cookies or IP addresses, to other devices.

Components of computer system 200 also include a system memory component 214 (e.g., RAM), a static storage component 216 (e.g., ROM), and/or a disk drive 217. Computer system 200 performs specific operations by processor 212 and other components by executing one or more sequences of instructions contained in system memory component 214. Logic may be encoded in a computer readable medium, which may refer to any medium that participates in providing instructions to processor 212 for execution. Such a medium may take many forms, including but not limited to, non-volatile media, volatile media, and transmission media. In various implementations, non-volatile media includes optical or magnetic disks, volatile media includes dynamic memory, such as system memory component 214, and transmission media includes coaxial cables, copper wire, and fiber optics, including wires that comprise bus 202. In one embodiment, the logic is encoded in non-transitory machine-readable medium. In one example, transmission media may take the form of acoustic or light waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer is adapted to read.

In various embodiments of the present disclosure, execution of instruction sequences to practice the present disclosure may be performed by computer system 200. In various other embodiments of the present disclosure, a plurality of computer systems 200 coupled by communication link 218 to the network (e.g., such as a LAN, WLAN, PTSN, and/or various other wired or wireless networks, including telecommunications, mobile, and cellular phone networks) may perform instruction sequences to practice the present disclosure in coordination with one another. Modules described herein can be embodied in one or more computer readable media or be in communication with one or more processors to execute or process the steps described herein.

A computer system may transmit and receive messages, data, information and instructions, including one or more programs (i.e., application code) through a communication link and a communication interface. Received program code may be executed by a processor as received and/or stored in a disk drive component or some other non-volatile storage component for execution.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Such software may be stored and/or used at one or more locations along or throughout the system, at client 102, network-based system 110, or both. Where applicable, the ordering of various steps described herein may be changed, combined into composite steps, and/or separated into sub-steps to provide features described herein.

The foregoing networks, systems, devices, and numerous variations thereof can be used to implement a real time upgrade operation during a purchased-access event such as a location-based upgrade for seats or other items at events using detected locations of event attendees during the event.

Figure 3:
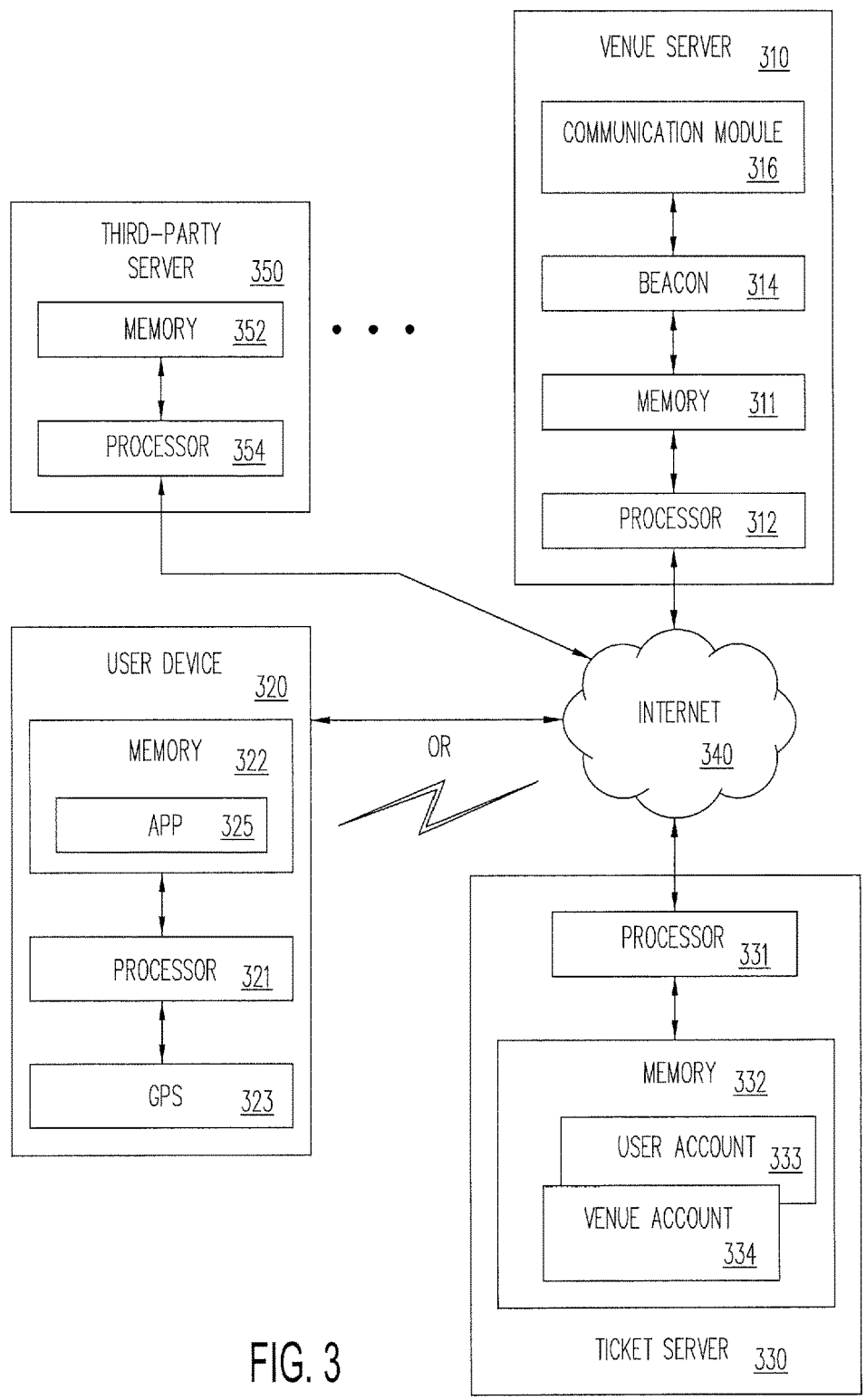
FIG. 3 is a block diagram of an illustrative system for facilitating real time upgrades for purchased-access events according to an embodiment.

FIG. 3 is a block diagram showing a ticket selection and purchase system that may be used to determine the location of an event attendee during an event at a venue and, based on the determined location, take suitable upgrade action for the attendee, according to an embodiment. As shown in FIG. 3, a ticket server 330 may be in communication with one or more user devices such as user device 320, one or more venue devices such as venue device 310, and one or more third-party servers such as a third-party server 350.

In some embodiments, a venue device such as a venue server 310 (sometimes referred to herein as a venue device or a venue system) can be present at each of a plurality of different event venues (e.g., stadiums, theaters, arenas, amphitheaters, airplanes, cruise ships, hotels, or other venues at which ticketed events are held or for which access to restricted portions of the venue can be purchased for a period of time). Venue server 310 can provide information regarding events scheduled to occur at a particular venue and regarding seating and/or other accommodations (e.g., hotel rooms, cruise ship cabins, etc.) at that venue. In some embodiments, venue server 310 can provide the information to ticker server 330. Ticket server 330 can obtain information regarding events scheduled to occur at various venues and information regarding seating and/or other accommodations at the various venues from one or more venue devices (servers) 310, from other sources, or ticket server 330 may have a database of event information and venue information independent of any interaction with a venue device. Ticket server 330 may, for example, be an implementation of system 110 of FIG. 1.

Venue server 310 can be a system that includes one or more computers, one or more servers, one or more computing tablets, one or more mobile devices, communications equipment, wireless transmitters or beacons and/or other suitable computing equipment, as examples. Venue device 310 can have processing circuitry such as a processor 312 and storage such as a memory 311. Venue device 310 may, according to some embodiments include one or more wireless beacons such as beacon 314 and communications equipment such as communications module 316.

Processor 312 can execute a software program stored in memory 311 for providing information regarding events scheduled to be at the venue, regarding seating at the venue, regarding user locations at the venue, or other information for each scheduled or ongoing event. Venue device 310 can provide the information to the ticket server and/or to a user device such as user device 320.

A connection between user device 320 and wireless beacon 314 may be established with or without user input from a user. For example, wireless beacon 314 may broadcast a token, such as a universally unique identifier (UUID), for reception by user device 320. User device 320 may receive the token from wireless beacon 314 (e.g., when user device 320 is in proximity to beacon 314). If user device 320 acknowledges the UUID as identifying a known service or location, user device 320 may transmit an identifier corresponding to user device 320 back to wireless beacon 314. User device 320 may communicate with wireless beacon 314 using, as examples, near field communications signals, Bluetooth signals, Bluetooth Low Energy signals, radio signals, infrared signals, or other wireless communications signals. The identifier from user device 320 may include, be transmitted with, concatenated with, or otherwise bundled with the identifier received from wireless beacon 314.

Communication module 316 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices. Wireless beacon 314 may utilize communications circuitry such as communications module 316 to communicate with ticket server 330 and/or user device 320. In various embodiments, wireless beacon 314 may be operated by the venue, by a ticket server, or by another service such as a payment provider.

Venue device 310 can be disposed at the venue. However, this is merely illustrative. If desired, venue device 310 can be disposed at a location other than the venue. Each venue can have a dedicated venue device 310 or a plurality of different venues can share a common venue device 310. For example, co-owned venues can share a common venue device 310.

In some embodiments, venue device 310 can be omitted if ticket server 330 has the information needed for buying and selling of tickets and/or providing real time upgrades. For example, ticket server 330 may have a database of available tickets and information about the tickets and venues that enables ticket server 330 to provide the necessary information to a user for providing location-based upgrades at venues.

Third party servers such server 350 may include, for example, a social media server that hosts one or more social networking accounts (e.g., a social networking account for a user of user device 320), an email server that hosts email services (e.g., an email account for the user), and/or a travel services server. A user may use user device 320 to access a social networking site that is hosted by one of servers 350, to send, store, and receive emails or other electronic communications on an email account that is hosted by one of servers 350, to research and/or purchase travel services, and/or other services on one of servers 350. The user may also use user device 320 to access ticket server 330 to select and purchase tickets for ticketed events from ticket server 330, to sell tickets for ticketed events, and/or to purchase upgrades at a venue (as examples).

Third party server 350 can be a computer, a server, a computing tablet, or a mobile device, as examples. Server 350 can have processing circuitry such as a processor 354 and storage such as a memory 352.

A processor 354 on a server 350 can execute one or more software programs stored in memory 352 for publishing user photos, videos, comments, captions, or other data such that are posted by the user. A processor 354 on another server 350 can store (e.g., using memory 352) and route emails or other communications for the user.

In one embodiment, servers 350 can be omitted if ticket server 330 has the information (e.g., seat information, location information, accommodations information) needed to generate and provide real time upgrades such as location-based upgrades. For example, ticket server 330 may have a database of purchases and/or user device information gathered from user device 320 that indicates the location and/or other interests of an attendee.

A user (e.g., an event attendee that is a potential upgrade purchaser) can use a device such as user device 320 to shop online for available tickets and/or real time upgrades associated with one or more events. User device 320 can be a mobile device such as a cellular telephone, a tablet computer, a laptop computer, or another portable computing device. User device 320 can be a non-mobile device such as a home (land line) telephone, a desktop computer, an interactive set top box, or the like. User device 320 can be any device or combination of devices that facilitate online ticket and/or upgrade viewing, selection, and/or purchasing. User device 320 may, for example, be an implementation of client device 104 of FIG. 1.

User device 320 can have a processor 321, a memory 322, a global positioning system component (GPS) 323 and/or other suitable device components. Processor 321 can execute an application such as an app 325 that facilitates the ticket selection, purchase, and/or upgrade methods disclosed herein. App 325 can be stored in a memory 322. App 325 can provide a graphical user interface (GUI) for the user when the user is selecting and purchasing tickets and/or upgrades online. If desired, app 325 can be a dedicated ticket purchasing app. However, this is merely illustrative. In some configurations, app 325 can be part of another app, such as a Paypal, Inc. payment provider app.

User device 320 can communicate with venue device 310, third-party server 350, and/or ticket server 330 via a network such as the Internet 340. User device 320 can communicate with the Internet via either a wired connection or a wireless connection. App 325 may be configured to transmit to ticket server 330 location information of user device 320. For example, ticket server 330 may have access to location information for a user based on location data from GPS 323.

Ticket server 330 may be operated by an online ticket seller such as StubHub, Inc. Ticket server 330 can facilitate online ticket sales and/or real time upgrades. Ticket server 330 may include processing circuitry such as a processor 331 in communication with storage such as a memory 332. Processor 331 can include one or more processors. Processor 331 can access accounts such as a user account 333 and/or a venue account 334 that are stored in memory 332. User account 333 can include information regarding the user (e.g., identification information, preferences, account numbers, purchase history, social network contacts, email contacts, email account permissions, social media account permissions, purchased-ticket event information, attended event information, etc.). Venue account 334 can include information regarding the venue (e.g., information regarding events, seating, venue location, and other venue features). Memory 332 can be separate from the ticket server and can be used to store any number of user accounts 333 and venue accounts 334. Memory 332 can be distributed, e.g., have portions thereof disposed at a plurality of different locations. Other accounts may also be accessible by processor 331, such as accounts of users selling tickets that include ticket details, such as price, quantity, location, and event information, and financial information that enable funds to be deposited into seller accounts when their tickets are sold.

Ticket server 330 may include one or more servers located at one or more locations. Thus, the ticket server 330 can be geographically and operationally distributed if desired. Ticket server 330 can be part of another system, such as a payment provider system. Venue device 310 and/or third-party server 350 can communicate with ticket server 330 over a wired or wireless connection such as via a network such as Internet 340. Venue device 310 and/or third-party server 350 can communicate with a plurality of different ticket servers 330. Ticket server 330 can communicate with a plurality of different venue devices 310 and/or third-party servers 350. A plurality of different ticket servers 330 can communicate among themselves and can be considered herein as being the same as a single ticket server 330. The user can operate user device 320 to interact with ticket server 330 so that the user can select, purchase, and/or sell tickets and/or view and/or purchase upgrades online.

Ticket server 330 can communicate with venue device 310 to obtain information about the venue. For example, ticket server 330 can communicate with venue device 310 to obtain information regarding the scheduling of events at the venue and regarding features of the venue. The features of the venue can be dependent upon the events of the venue, e.g., the features of the venue can vary from event to event. Generally, venue device 310, mobile device 320, third-party server 350, and ticket server 330 can perform functions discussed herein. That is, at least to some extent, a function that is discussed herein as being performed via a particular one of these devices can be performed by a different one of these devices, by a combination of these devices, and/or by other devices.

Venue device 310, user device 320, third-party server 350, other mobile devices, and server 330 can communicate with one another via a network, such as the Internet 340 or with one another via one or more networks, such as local area networks (LANs), wide area networks (WANs), cellular telephone networks, and the like. Venue device 310, mobile devices such as user device 320, third-party server 350, server 330, and other devices can communicate with one another, at least partially, via one or more near field communications (NFC) methods or other short range communications methods, such as infrared (IR), Bluetooth, WiFi, and WiMax.

When a user wishes to shop for tickets online, resell tickets online, check into a venue such as an event venue online, access electronic tickets online, provide location information online, and/or view and/or purchase real time upgrades online (as examples), the user can open an online ticket seller's website or can access the ticket seller using an application such as app 325. The user can open the ticket seller's website using user device 320, for example. The ticket seller's website can be hosted on ticket server 330, venue device 310, or on any other server or device.

An event venue may be any venue for which an attendee can purchase access (e.g., ticketed access) to particular locations or portions within the venue for a period of time. Without being limiting examples of event venues may include a stadium, a theater, an arena, an amphitheater, an airplane, a train, a hotel, or any another venue into which an attendee can purchase access.

FIG. 4 is a diagram of an event venue 400 in accordance with an embodiment. In the example of FIG. 4, a venue 400 may be a stadium, a theater, an arena, an amphitheater, a fairground, or another indoor or outdoor venue for events such as sporting events, concerts, plays, performances, competitions, races, or other entertainment events.

As shown in FIG. 4, venue 400 may include an attraction area 402 and various locations for which a ticketholder can have purchased access such as seats 404, or other restricted access sections of venue 400 such as a general admission section, a standing room only section, a floor section, or the like. Attraction area 402 may be a court, a field, a stage, a track, a rink, or any other suitable portion of a venue at which events can be conducted. Venue 400 may include one or more concession areas such as concession stands 406 (e.g., a food-service stand, a team memorabilia store, a drink stand, or other vendor stand). Concession stands 406 may be located in an aisle 405 or elsewhere in venue 400.

Venue 400 may include one or more communications systems such as a system of one or more wireless beacons 314. Beacons 314 may be disposed at any suitable location within venue 400. For example, a beacon may be located near concession stand 406, within or adjacent to each section of venue 400, within or adjacent to groups of sections within venue 400, or on or within each seat within venue 400.

A user of a system of the type described in connection with, for example, FIGS. 1 and/or 3 (e.g., an attendee of an event at venue 400) may have a ticket for a particular seat such as seat 410. However, the system may determine that the attendee is at a location such as user location 412 (sometimes referred to herein as an attendee location) that is different from the location of the user's seat 410 at any particular time during an event. User location 412 may be a current location of the event attendee or a time-averaged location of the event attendee (as examples).

The system may, in some embodiments, determine the locations of one or more associates (e.g., friends, family members, coworkers, team members, social media contacts, email contacts, or other associated people) of the user. For example location 413 may be an associate location of an associate of the user. Associates of a particular user may be determined and/or discovered before or during an event based on user account information, email scraping and/or social media account scraping information, communications between a user device of the user and a user device of another user before or during an event, communications between a user device of a previously determined associate of the user and user devices of one or more other users before or during an event, or other public or user-provided information regarding people that the user knows or otherwise associates with.

Attendee location 412 and/or associate location 413 may be determined based on location information (e.g., GPS information, WiFi information, NFC information, etc.) from a user device of the attendee and/or communication between the user device and one or more of wireless beacons 314. For example, when a user device of the user is in communication with a particular one of beacons 314 for a period of time, the user location 412 and/or the associate location 413 may be determined to be in proximity to that beacon 314. Communications between a user's device and one or more beacons 314 may be used to determine an amount of time that a user spends in a particular location (e.g., a location that is different from the location of the user's seat). In one embodiment, a determined amount of time that a user has spent in a particular location may be compared with a threshold time and, when the amount of time the user has spent in that location exceeds the threshold time, an upgrade offer for the user may be triggered.

Location 412 and/or location 413 may be determined to within an area corresponding to a section of venue 400, a group of seats of venue 400 (e.g., within 8 rows of seats, or within 25 seats), a single seat 404, or smaller than a single seat 404. The system may determine (e.g., by tracking user location 412) that the user is primarily spending time at a location other than their seat and generate an upgrade offer based on the user's location. For example, the user may be spending time near friends sitting in other seats 404, enjoying the event in other sections of venue 400 (e.g., sections relatively closer to attraction area 402), or the user may be particularly interested in a product that is available at a particular concession stand 406. For example, the system may determine that a particular attendee is making multiple trips to a beer stand during an event.

In response to detecting an attendee location other than the attendee's seat location, the system may identify one or more available seats such as seat 414 near the user's determined location and offer the user an upgrade to the available seat 414 (e.g., at an additional cost). For example, a seat near the user's location may be a seat that is relatively closer to the user's location and/or, if desired, relatively closer to the attraction area or a concession stand than the user's seat is to that location.

In response to detecting the locations of one or more associates of the user that are attending the same event as the user (e.g., in a location 413 such as a premium section of the venue), the system may identify one or more available seats near the associate location and offer the user an upgrade to that available seat. For example, a seat near the associate location may be a seat that is relatively closer to the associate location than the user's seat is to that location.

The user may be provided with an upgrade offer on the user's mobile device by an application such as app 325 of FIG. 3 running on the mobile device. FIGS. 5 and 6 show examples of upgrade offers that may be provided to a system user such as an event attendee using a user device of the attendee.

As shown in FIG. 5, an upgrade offer may be provided to a user on a user device such as mobile device 500. An upgrade offer such as upgrade offer 504 may be provided in a window such as upgrade offer window 502 on a display of mobile device 500. For example, window 502 may be a pop up window generated by an application such as app 325 (see, e.g., FIG. 3) running on device 500. However, this is merely illustrative. If desired, window 502 may be a portion of a ticket seller website that the user has logged into or may be otherwise generated on a display of mobile device 500 as would be understood by one skilled in the art.

Upgrade offer 504 may include text stating (for example) "THERE ARE SEATS AVAILABLE NEAR YOUR CURRENT LOCATION. WOULD YOU LIKE TO UPGRADE YOUR TICKET TO SEAT A IN SECTION B FOR $50?". In the example of FIG. 5, an upgrade price 508 (e.g., $50) is included in the upgrade offer. However, this is merely illustrative. In another example, the price of the upgrade may be provided to the user when the user selects the upgrade offer or a venue may offer upgrades at no cost in order to fill sections of the venue, facilitate providing of advertisements to the user, or to enhance the user experience, thereby developing and encouraging repeat business with the user.

Upgrade offer window 502 may include an upgrade acceptance icon such as a virtual UPGRADE button 506. UPGRADE button 506 may be selected by a user by selecting the UPGRADE button (e.g., using a finger or other instrument on a touch screen or using a mouse-controlled or touchpad-controlled cursor). UPGRADE button 506 may cause a ticket server or an application running on mobile device 500 to open an additional window into which payment information can be entered for a selected upgrade or UPGRADE button 506 may be a one-click upgrade button that, when clicked or tapped, fully completes an upgrade transaction including providing an upgrade ticket to the user and transferring any funds associated with the upgrade from an account of the user to, for example, an account associated with the venue, the event, and/or or a ticket server. In some embodiments, multiple upgrade offers may be presented to a user in a particular upgrade offer window 502 thereby allowing the user to choose between various upgrade options (e.g., at various corresponding upgrade prices). Upgrade offers such as upgrade offer 504 may be generated based on the location of the user. The price of a particular upgrade may be determined based on the length of time the user has spent in a particular location, a remaining time in the event, event popularity, or other suitable information. In this way, an event attendee may be provided with an enhanced event experience though the opportunity to remain legitimately in a new location in the venue and the venue or event owner may be provided with the ability to make an additional profit using the attendee's demonstrated interest in a particular location in the venue.

Upgrade offers for event attendees may be based on the user's location and/or other information such as purchases of the user and/or the locations of one or more associates of the user. In the example in which it is determined that a particular user is making frequent trips to a beer stand, the system may also identify one or more purchases (e.g., beer purchases, food purchases, etc.) by the user during the event (e.g., by using payment information associated with the one or more purchases and detected by the system) and offer an upgrade that includes products associated with the identified purchases. In some embodiments, the system may also or alternatively identify one or more purchases made by the attendee prior to the event (e.g., a purchase history of the attendee) and offer an upgrade that includes products associated with those identified purchases.

FIG. 6 shows examples of upgrade offers that may be made to an event attendee based on the user's proximity to, and/or purchases from, a concession stand. As shown in FIG. 6, an upgrade offer 602 may include product related information 601 in, for example, upgrade offer text such as "IT'S A LONG WAY FROM YOUR SEAT TO THE BEER STAND. WOULD YOU LIKE TO UPGRADE TO A SEAT NEARBY FOR $25?".

In some embodiments, an upgrade offer may include a package upgrade offer that includes products the user has expressed interest in (e.g., based on the user's location, purchase history, or other information). In the example of FIG. 6, window 502 also includes a package upgrade offer 604 (e.g., text prompting the user to determine whether they would like to add one or more products such as a concession package to an upgrade such as "ADD THREE BEERS FOR $10 MORE"). The price (e.g., $10) of a packaged product addition (e.g., three beers) may be determined based on the user's interest in the product, the selling price of the product or other factors). Window 502 may include a package upgrade acceptance icon such as a virtual PACKAGE UPGRADE button 608. PACKAGE UPGRADE button 608 may be selected by a user by selecting the PACKAGE UPGRADE button (e.g., using a finger or other instrument on a touch screen or using a mouse-controlled or touchpad-controlled cursor). PACKAGE UPGRADE button 608 may cause a ticket server or an application running on mobile device 500 to open an additional window into which payment information can be entered for a selected package upgrade or PACKAGE UPGRADE button 608 may be a one-click upgrade button that, when clicked or tapped, fully completes an package upgrade transaction including providing an upgrade ticket to the user, providing the packaged product or an electronic voucher for the packaged product, and transferring any funds associated with the package upgrade from an account of the user to, for example, an account associated with the venue, event, and/or a ticket server. A package upgrade offer may be presented to an event attendee as an addition to upgrade offer 602 or upgrade offer 602 and package upgrade offer 604 may be presented in a single, combined upgrade offer for one or more upgraded seats and one or more products such as concession packages.

Real time upgrades such as location-based upgrades of the type described herein may be performed during events other than sporting or performance events such as airplane flights, hotel stays, cruises, or other events.

Figure 7:
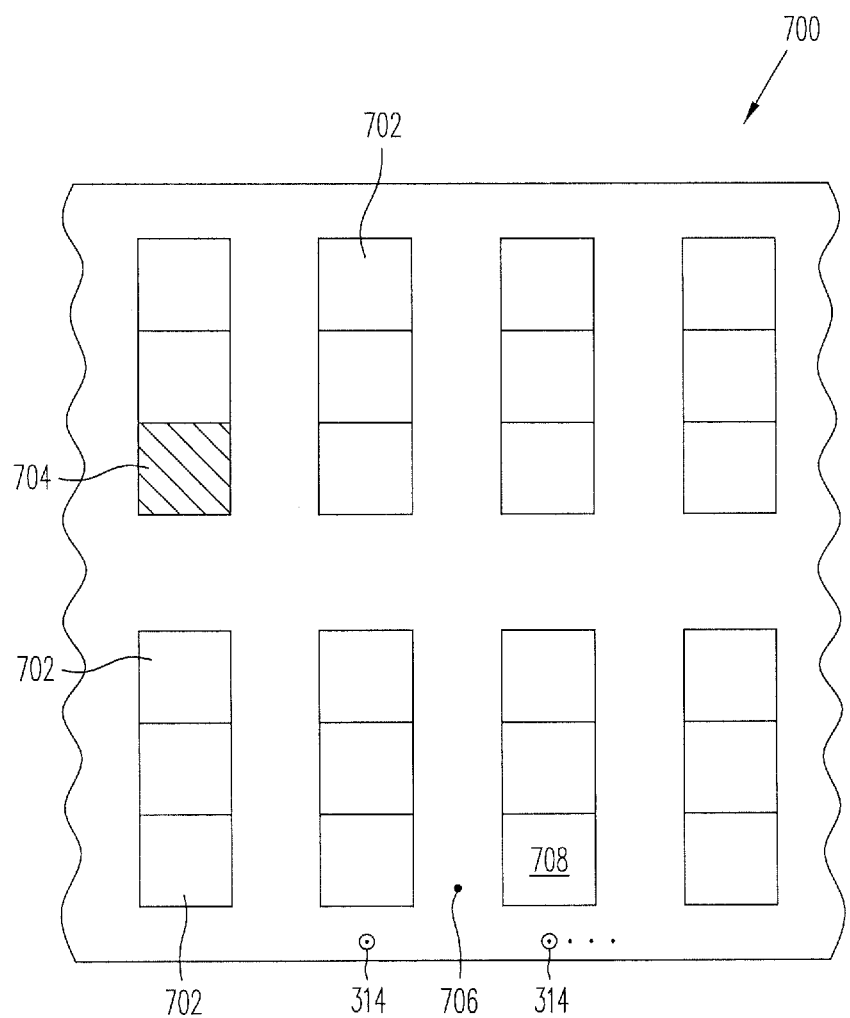
FIG. 7 is a diagram of an illustrative vehicle showing a passenger location and various other locations in the vehicle according to an embodiment.

FIG. 7 shows a portion of an airplane 700 having seats 702 according to an embodiment. A passenger on airplane 700 (e.g., a flight event attendee) may have a purchased ticket for one of seats 702 such as seat 704. During the flight, it may be determined (e.g., by a ticket server system, an airline system, a payment system or other system as described herein) that the passenger has a location 706 other than the location of seat 704. For example, location 706 may be determined using one or more wireless beacons 314 located on the airplane and in communication with a user device of the passenger and/or using GPS coordinates or other location information from a user device of the passenger. In response to determining that the user is located at a location 706 currently or for a period of time, the system may identify one or more available seats such as seat 708 near location 706 and offer one or more upgrades to the user for one or more of the identified seats for an upgrade price as described herein. If desired, other items such as food items, future flight discounts, or other travel related items can be included in a package with the upgrade offer as described herein.

Figure 8:
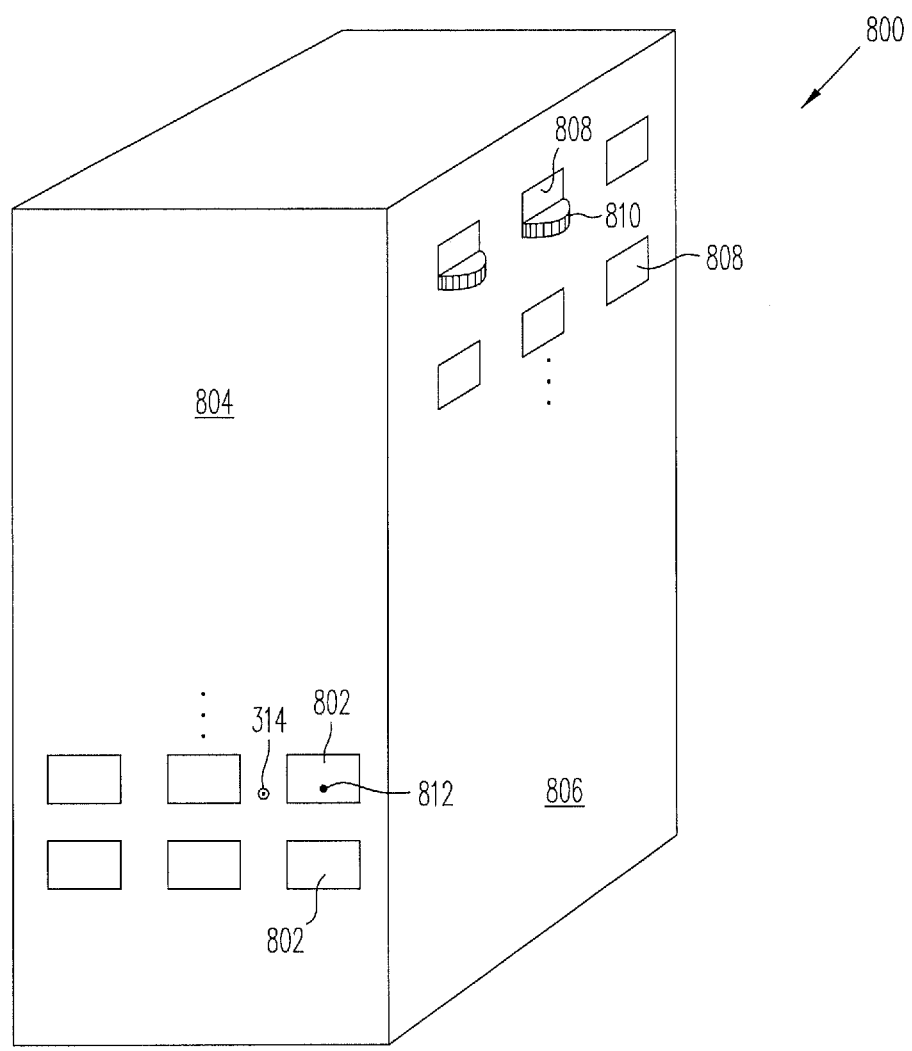
FIG. 8 is a diagram of an illustrative hotel showing a guest location and various other locations in the hotel according to an embodiment.

FIG. 8 shows a portion of a hotel 800 according to an embodiment. For example, hotel 800 may have rooms 802 located on a side such as side 804 of hotel 800 and rooms 808 located on another side such as side 806 of hotel 800. Hotel 800 may be located near an attraction such as a body of water (e.g., an ocean, a lake, a pond, a swimming pool), a cityscape, a park or other area that creates a desired view for a hotel guest (e.g., a hotel attendee). Depending on the location and orientation of the hotel, rooms 808 on one side such as side 806 of hotel 800 may be preferred with respect to rooms 802 on another side such as side 804 of hotel 800. For example, rooms 808 on side 806 may have a preferred view.

A guest of hotel 800 may have purchased access to one of rooms 802. During a stay at the hotel, the locations of various guests may be tracked. For example, a particular guest may be determined to be spending significant amounts of time at a location 812 near the window of a room on side 804. For example, location 812 may be determined using one or more wireless beacons 314 located in or near the hotel and in communication with a user device of the guest and/or using GPS coordinates from a user device of the guest. The system may determine that that particular guest has demonstrated an interest in a view and may offer that guest an upgrade to a room 808 on side 806 of hotel 800. Some rooms such as rooms 808 may also have outdoor balconies 810. An upgrade offer may include an offer for a room with a balcony 810. Location-based hotel upgrade offers may be provided to a user of a system on a mobile device of the user as, for example, described herein. If desired, other items such as food items, future hotel discounts, or other travel related items can be included in a package with the upgrade offer as described herein.

Figure 9:
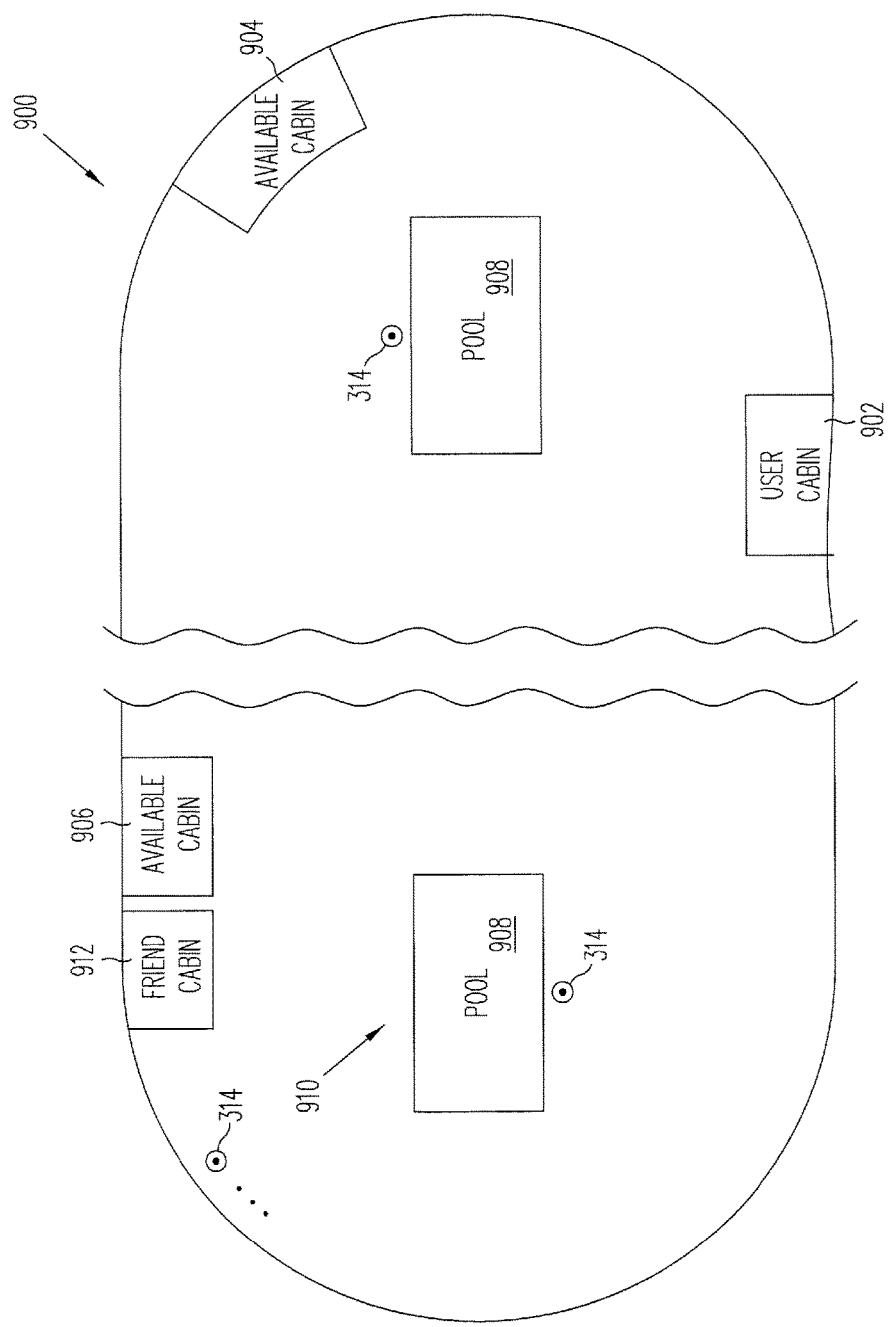
FIG. 9 is a diagram of an illustrative cruise ship showing a passenger location and various other locations on the cruise ship according to an embodiment.

FIG. 9 shows a portion of a cruise ship having guest cabins such as user cabin 902, available cabins 904 and 906, and a cabin 912 of a friend of a user according to an embodiment. A passenger on cruise ship 900 (e.g., a cruise event attendee) may have a purchased ticket for one cabin 902. During the cruise, it may be determined (e.g., by a ticket server system, a ship system, a payment system or other system as described herein) that the passenger is spending a significant amount of time at a location 910 that is relatively far from user cabin 902 and relatively closer to one or more of available cabins such as cabins 904 and/or 906. For example, the passenger may prefer to spend time near a particular swimming pool 908, a particular restaurant (not shown), or other particular ship amenities. For example, location 910 may be determined using one or more wireless beacons 314 located on the cruise ship and in communication with a user device of the passenger and/or using GPS coordinates from a user device of the passenger.

In one example scenario, a passenger having friends in cabin 912 near a particular pool 908 may traverse a portion of the ship to spend time near that pool 908. In response to determining that the user is located at a location 910 near the pool currently or for a period of time, the system may identify one or more available cabins such as available cabin 906 near location 910 and offer one or more upgrades to the user for one or more of the identified cabins for an upgrade price as described herein. If desired, other items such as food items, future cruise discounts, or other cruise or other travel related items can be included in a package with the upgrade offer as described herein.

Figure 10:
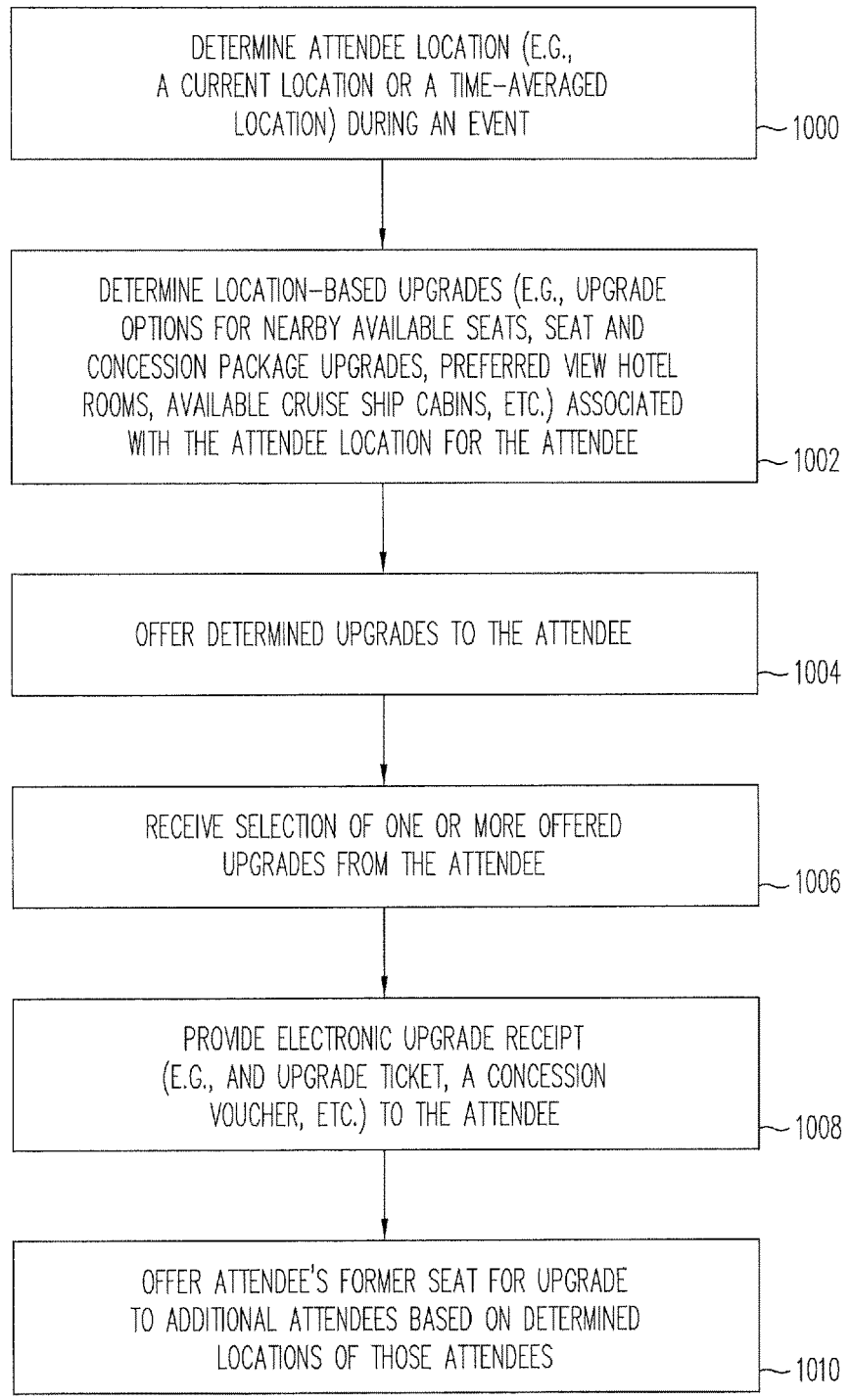
FIG. 10 is a flowchart showing an illustrative process that may be performed for offering real time upgrades to event attendees according to an embodiment.

Illustrative steps that may be performed by, for example, a system of the type described herein, for generating a providing real time upgrades such as location-based upgrades to attendees of events at venues are shown in FIG. 10.

At step 1000, an attendee location such as a current location or a time-averaged location of the attendee may be determined by the system during an event (e.g., a sporting event, a concert event, a performance event, a competitive event, a fair, an airplane flight event, a train trip event, a hotel stay event, a cruise event, or other event for which a user of a system of the type described herein can purchase access such as ticketed access). Determining the attendee location may include determining an amount of time that the attendee has spent in a particular location (e.g., using one or more wireless beacons) and, if desired, comparing the determined amount of time with a threshold time. In some embodiments, the locations of other attendees such as associates of the attendee that are also attending the event may be determined.

At step 1002, one or more location-based upgrades based on the determined attendee location may be determined for the attendee. The location-based upgrades may include upgrade options for upgrading to nearby available seats, rooms, cabins, etc., seat and concession packages, preferred view hotel rooms, available cruise ship cabins or other upgrade options associated with the location of the attendee. Determining the location-based upgrades may include identifying one or more purchases made by the attendee during or before the event and including a concession package or other additional items based on the identified purchases in the upgrade offer. Determining the location-based upgrades may include identifying an available seat near the determined attendee location and/or near a determined associate location.

At step 1004, the determined location-based upgrade options may be offered to the attendee (e.g., on the user's mobile device as described herein).

At step 1006, a selection of one or more of the offered location-based upgrades may be received from the attendee (e.g., when the attendee selects an upgrade or package upgrade virtual button as described herein). The system may facilitate payment for the selected upgrade from the attendee (e.g., by transferring funds from an account of the attendee, by charging a credit card of the attendee, or otherwise facilitating payment).

At step 1008, the system may provide an electronic upgrade receipt (e.g., an upgrade ticket, a concession voucher, or other proof of purchase and/or access voucher with which the user can obtain the purchased upgrade) to the attendee.

At step 1010, the system may optionally offer the attendee's former seat for upgrade to additional attendees based on the determined locations of those attendees (e.g., responsive to determining that one or more of the additional attendees is located near the attendee's former seat).

One or more of the processes and steps described in connection with FIG. 10 may be performed in any suitable order, omitted, and/or repeated any suitable number of times until, for example, the event has ended.

Figure 11:
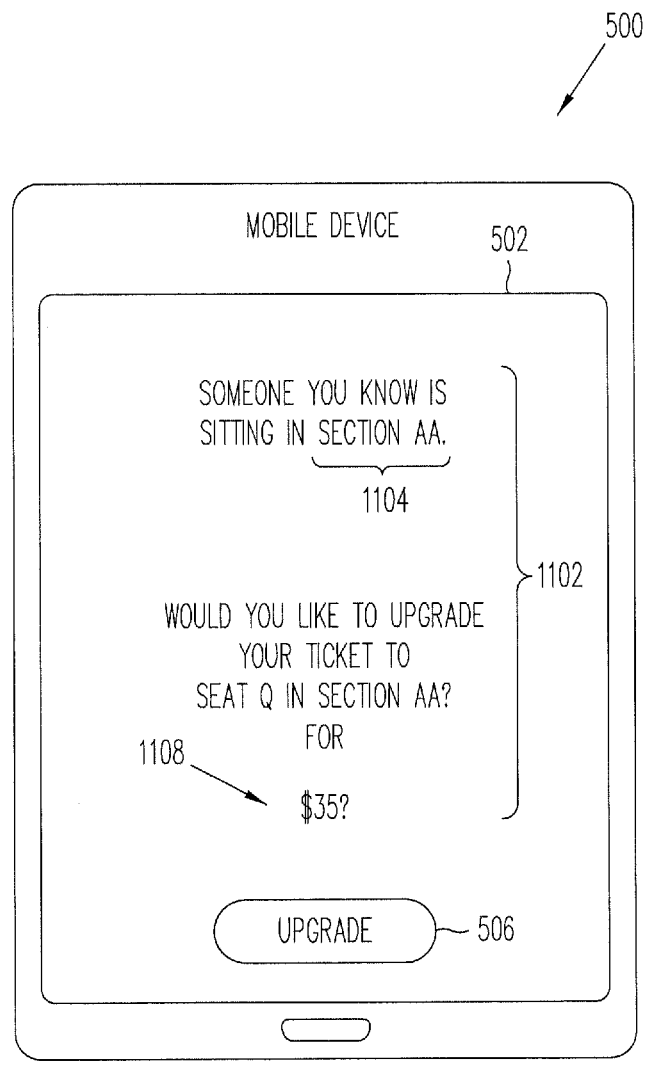
FIG. 11 is a diagram of an illustrative location-based upgrade offer that is based on a location of an associate of the user and that may be provided to a user on a mobile device according to an embodiment

FIG. 11 shows examples of an upgrade offer that may be made to an event attendee based on the determined location of one or more associates of the attendee that are also attending the same event. As shown in FIG. 11, an upgrade offer 1102 may include associate location information 1104 in, for example, upgrade offer text such as "SOMEONE YOU KNOW IS SITTING IN SECTION AA. WOULD YOU LIKE TO UPGRADE YOUR TICKET TO SEAT Q IN SECTION AA FOR $35?". A location-based upgrade offer such as offer 1102 that is based on the location of one or more associates of an event attendee may be generated by identifying one or more associates of the attendee (e.g., using account information of the attendee, email information of the attendee, social media information of the attendee, and/or communications between one or more devices of the attendee and/or other event attendees), determining that the identified associates are attending the event (e.g., using purchase information, social media information, email information, and/or check-in information of the identified associates and/or communications during the event between one or more devices of the attendee and the associates), determining the location(s) of the identified associates that are attending the event, identifying one or more available seats near the associate location(s), determining an upgrade price 1108 for the upgrade, and providing the upgrade offer to the attendee. In this way, in one embodiment, an upgrade offer that is based on the location of one attendee of an event (e.g., the associate location) may be provided to another attendee of the event.

Although the examples of real time upgrades such as location-based upgrades described herein have been generally described as upgrades for a single attendee of an event, it should be appreciated that real time upgrades such as location-based upgrades can be provided to groups of attendees that are attending an event together and/or seated together. For example, when an upgrade is determined for a particular attendee, related upgrades may also be determined for other members of the attendee's group. For example, a family of four may be attending a sporting event at a venue, and it may be determined that some or all of the family members have spent an amount of time at a location that is different from the location of the family's four seats (e.g., the kids may be spending time near a mascot or a fan game or the mother may be making multiple trips to a hot dog stand), four available seats may identified near the location, and an upgrade offer for all four members of the family for the four available seats may be provided to the family members.

In some embodiments, upgrade offers for groups of attendees may be partially individualized for each member of the group. For example, when a family of four is offered an upgrade for four upgrade seats, package upgrade offers may also be included that are individualized (e.g., the parents may be offered a beer package and the children may be offered discounted team apparel). An offer for a location-based upgrade for a group of attendees may be provided to some or all of the members of the group.

Although the foregoing invention has been described in detail by way of illustration and example for purposes of clarity and understanding, it will be recognized that the above described invention may be embodied in numerous other specific variations and embodiments without departing from the spirit or essential characteristics of the invention. Various changes and modifications may be practiced, and it is understood that the invention is not to be limited by the foregoing details, but rather is to be defined by the scope of the claims.

What is claimed is:

1. A system, comprising:
  one or more wireless beacons;
  a communication module;
  a non-transitory memory; and
  one or more hardware processors coupled to the non-transitory memory, the one or more wireless beacons, and the communication module, and configured to execute instructions from the non-transitory memory to cause the system to perform operations comprising:
    electronically tracking an attendee location of an attendee as the attendee moves through a venue at an event based at least on a communication received at the communication module from a mobile device of the attendee with the one or more wireless beacons in the venue, wherein the communication is based at least in part on a broadcast token wirelessly transmitted by the one or more wireless beacons and wirelessly received by the mobile device, wherein the electronically tracking the attendee location at the venue comprises:
      wirelessly transmitting the broadcast token by the one or more wireless beacons;
      wirelessly receiving at the communication module a first indication in the communication from the mobile device via the one or more wireless beacons, the first indication including a first response to the broadcast token, the first response including an electronic identifier of the attendee;
      wirelessly receiving at the communication module a second indication in the communication from the mobile device via the one or more wireless beacons, the second indication including a second response to the broadcast token, the second response including the electronic identifier of the attendee; and
      determining, based on a difference in the first indication and the second indication that the attendee location moved from a first area of the venue to a second area of the venue, wherein the second indication indicating the second area is larger than a single seat;
    electronically accessing a seat database and identifying, using the second area of the venue, a set of vacant seats in the venue that are proximate to the second area of the venue;
    electronically accessing over a network a purchase history database and identifying in the purchase history database, using the electronic identifier of the attendee and payment information associated with the attendee, past purchases of the attendee associated with one or more other events;
    electronically accessing over the network a ticket database and selecting a vacant seat from the set of vacant seats in the venue from the ticket database based on the attendee location being in the second area and based on the past purchases of the attendee, wherein selecting the vacant seat from the set of vacant seats includes:
      identifying at least one common characteristic between the past purchases and the vacant seat; and
      selecting the vacant seat based on the at least one common characteristic;
    transmitting by the communication module over the network an offer transmission, the offer transmission configured to cause an application of the mobile device to generate a pop up window and cause a graphical user interface (GUI) of the mobile device to display an offer to upgrade to the vacant seat; and
    receiving at the communication module an acceptance of the offer to upgrade to the vacant seat, the acceptance based on a touch-sense input detected at the GUI of the mobile device.

2. The system of claim 1, wherein the operations further comprise:
determining that an amount of time the attendee is at the second area corresponds to a threshold amount of time, wherein the vacant seat in the venue is determined based at least on the amount of time that the attendee is at the second area corresponding to the threshold amount of time.

3. The system of claim 1, wherein the operations further comprise:
receiving an attendee selection of a given seat from the vacant seat, wherein the acceptance of the offer to upgrade is further based on an transaction for the given seat selected; and
providing an electronic upgrade receipt to the mobile device of the attendee based at least on the of the transaction for the given seat.

4. The system of claim 1, wherein the upgrade comprises a package upgrade that includes the upgrade to the vacant seat and a concession package.

5. The system of claim 1, wherein the venue comprises an airplane and wherein the upgrade to the vacant seat comprises an vacant airplane seat.

6. The system of claim 1, wherein the attendee location comprises a location of a reserved seat of the attendee with a first view of an attraction area in the venue, and
wherein the upgrade corresponds to a vacant seat identified from the vacant seat with a second view of the attraction area that is closer to the attraction area than the first view.

7. The system of claim 1, wherein the operations further comprise:
determining a distance from the attendee location to a reserved seat for the attendee; and
determining the attendee is away from the reserved seat for an amount of time based at least on the distance determined, and
wherein the upgrade is displayed in response to the amount of time the attendee is away from the reserved seat being greater than first threshold.

8. The system of claim 1, wherein the attendee location comprises a current location or a time-averaged location.

9. The system of claim 1, wherein the attendee has previously purchased a ticket for a seat at the event at the venue, wherein the operations further comprise:
designating the seat as being a vacant seat in the purchase history database responsive to determining the acceptance of the offer to upgrade; and
offering the seat to a second attendee based on a location of the second attendee in the venue.

10. The system of claim 1, wherein the offer to upgrade to the vacant seat is displayed via the GUI of the mobile device during the event in the venue, wherein the vacant seat is associated with the event.

11. A method, comprising:
electronically tracking, by one or more hardware processors, an attendee location of an attendee as the attendee moves through a venue at an event based at least on a communication received at a communication module from a mobile device of the attendee with one or more wireless beacons in the venue, wherein the communication with the mobile device is based at least in part on a broadcast token wirelessly transmitted based on instructions from the one or more hardware processors and wirelessly received by the mobile device, wherein the electronically tracking the attendee location at the venue comprises:
wirelessly transmitting the broadcast token by one or more wireless beacons;
wirelessly receiving at the communication module a first indication in the communication from the mobile device via the one or more wireless beacons, the first indication including a first response to the broadcast token, the first response including an electronic identifier of the attendee;
wirelessly receiving at the communication module a second indication in the communication from the mobile device via the one or more wireless beacons, the second indication including a second response to the broadcast token, the second response including the electronic identifier of the attendee; and
determining, based on a difference in the first indication and the second indication that the attendee location moved from a first area of the venue to a second area of the venue, wherein the second indication indicating the second area is larger than a single seat;
electronically accessing a seat database and identifying using the second area of the venue, a set of vacant locations in the venue that are proximate to the second area of the venue;
electronically accessing over a network a purchase history database and identifying in the purchase history database, using the electronic identifier of the attendee and payment information associated with the attendee, past purchases of the attendee;
electronically accessing over the network a ticket database and selecting a vacant location from the set of vacant locations in the venue from the ticket database based on the attendee location and the past purchases of the attendee, wherein selecting the vacant location from the set of vacant locations includes:
identifying at least one common characteristic between the past purchases and the vacant location; and
selecting the vacant location based on the at least one common characteristic;
transmitting by the communication module over the network an offer transmission, the offer transmission configured to cause an application of the mobile device to generate a pop up window and cause a graphical user interface (GUI) of the mobile device to display an offer to upgrade to the vacant location; and
receiving at the communication module an acceptance of the offer to upgrade to the vacant location, the acceptance based on a touch-sense input detected at the GUI of the mobile device.

12. The method of claim 11, wherein the pop up window runs on the mobile device and the pop up window displays a description of the vacant location on the GUI of the mobile device.

13. The method of claim 11, wherein the venue comprises an attraction area,
wherein the identifying the set of vacant locations comprises determining that the vacant location from the set of vacant locations is closer to the attraction area than the attendee location, and
wherein the pop up window further indicates the vacant location is closer to the attraction area than the attendee location.

14. The method of claim 11, wherein the venue comprises a concession stand, wherein identifying the set of vacant locations comprises determining that the vacant location from the set of vacant locations is closer to the concession stand than the attendee location, and wherein the pop up window further indicates the vacant location is closer to the concession stand than the attendee location.

15. The method of claim 11, further comprising:

determining a second communication from an associate of the attendee; and identifying a second location that corresponds to the associate of the attendee, wherein identifying the set of vacant locations comprises determining that the vacant location from the set of vacant locations is closer to the second location that corresponds to the associate than the attendee location.

16. The method of claim 15, wherein the pop up window further indicates that the vacant location is closer to the associate of the attendee than the attendee location.

17. The method of claim 11, wherein the venue comprises a venue selected from the group consisting of: an airplane, a hotel, and a cruise ship.

18. A non-transitory machine-readable medium having stored thereon machine-readable instructions executable to cause a machine to perform operations comprising:

electronically tracking an attendee location of an attendee as the attendee moves through a venue at an event based at least on a communication received at a communication module from a mobile device of the attendee with one or more wireless beacons in the venue; wherein the communication with the mobile device is based at least in part on a broadcast token wirelessly transmitted and wirelessly received by the mobile device, wherein the electronically tracking the attendee location at the venue comprises:

wirelessly transmitting the broadcast token by one or more wireless beacons;

wirelessly receiving at the communication module a first indication in the communication from the mobile device via the one or more wireless beacons, the first indication including a first response to the broadcast token, the first response including an electronic identifier of the attendee;

wirelessly receiving at the communication module a second indication in the communication from the mobile device via the one or more wireless beacons, the second indication including a second response to the broadcast token, the second response including the electronic identifier of the attendee; and determining, based on a difference in the first indication and the second indication that the attendee location moved from a first area of the venue to a second area of the venue, wherein the second indication indicating the second area is larger than a single seat;

electronically accessing a seat database and identifying, using the second area of the venue, a set of vacant seats in the venue that are proximate to the second area of the venue;

electronically accessing over a network a purchase history database and identifying in the purchase history database, using the electronic identifier of the attendee and payment information associated with the attendee, past purchases of the attendee associated with one or more other events;

electronically accessing over the network a ticket database and selecting a vacant seat from the set of vacant seats in the venue from the ticket database based on the attendee location being in the second area and based on the past purchases of the attendee, wherein selecting the vacant seat from the set of vacant seats includes:

identifying at least one common characteristic between the past purchases and the vacant seat; and selecting the vacant seat based on the at least one common characteristic;

transmitting by the communication module over the network an offer transmission, the offer transmission configured to cause an application of the mobile device to generate a pop up window and cause a graphical user interface (GUI) of the mobile device to display an offer to upgrade to the vacant seat; and receiving at the communication module an acceptance of the offer to upgrade to the vacant seat, the acceptance based on a touch-sense input received by the GUI of the mobile device.

19. The non-transitory machine-readable medium of claim 18, wherein the operations further comprise:

identifying a purchase made by the attendee during the event; and generating the offer to upgrade to the vacant seat based on the purchase made by the attendee during the event.

20. The non-transitory machine-readable medium of claim 19, wherein the identifying the purchase made by the attendee during the event comprises identifying a venue location associated with a sale of a product.

* * * * *